United States Patent Office 3,306,910
Patented Feb. 28, 1967

3,306,910
PRODUCTION OF THIOLACTAM COMPOUNDS
Rector P. Louthan, Bartlesville, Okla., assignor to Phillips Petroleum Company, a corporation of Delaware
No Drawing. Filed Sept. 14, 1964, Ser. No. 396,408
8 Claims. (Cl. 260—326.83)

This invention relates to sulfur-containing compounds and the synthesis thereof. In one aspect, this invention relates to the preparation of a thiolactam by treating a lactam with hydrogen sulfide in the presence of an alkaline material. Another aspect of this invention relates to improved production of a thiolactam by the use of an alkali metal hydroxide and/or ammonium hydroxide and hydrogen sulfide. Still another aspect of this invention relates to the preparation of a thiolactam by treating a lactam with hydrogen sulfide in the presence of a minor amount of an alkali metal hydroxide or ammonium hydroxide.

The preparation of a thioketone by reacting a ketone with carbon disulfide or phosphorus pentasulfide is known. It is also known that certain compounds, such as thiolactams, are useful in the preparation of widely manufactured and used dyestuffs. As evident from a study of the prior art, the preparation of these sulfur-containing compounds is not only complex but also expensive.

I have now found that a lactam can be converted to a thiolactam, cheaply and efficiently, by treating said lactam with H₂S, preferably in the presence of a small amount of an alkaline material such as an alkali metal and/or ammonium hydroxide.

Accordingly, it is an object of this invention to produce a sulfur-containing compound by a novel, yet simple and economical method. Another object is to provide a new process for the preparation of a thiolactam.

Other aspects, objects and the several advantages of this invention will be apparent to one skilled in the art having studied this disclosure and the appended claims.

According to this invention, the thio compound is prepared by reacting a lactam with hydrogen sulfide at an elevated temperature and/or pressure in the presence of a small amount of an alkali metal hydroxide and/or ammonium hydroxide.

The lactams which are utilized in this invention are represented by the formula:

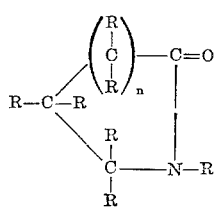

Formula I wherein each R is selected from the group consisting of hydrogen, alkyl and cycloalkyl radicals, and mixtures of two or more of the foregoing. The hydrocarbon radicals can be saturated aliphatic or cycloaliphatic radicals and combinations thereof containing from 1 to 6 carbon atoms, inclusive, wherein $n$ is an integer selected from the group consisting of 0 to 10, inclusive, and wherein the total number of carbon atoms in said lactams generally does not exceed 20.

The thiolactams which are prepared by this invention are represented by the formula

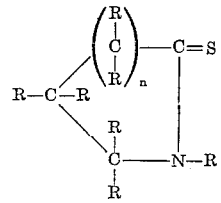

Formula II wherein R and $n$ are as defined hereinabove.

Representative, but not limiting, examples of lactams which are converted to thiolactams by this invention include 2-azetidinone
2-pyrrolidinone
2-piperidone
Caprolactam
N-methyl-2-pyrrolidinone
N-ethylcaprolactam
3,3-di-n-propyl-2-piperidone
3-n-hexyl-caprolactam
N-cyclopentylcaprolactam
N-cyclopentyl-heptanoic acid lactam
Tridecanoic acid lactam
3,4,5-tri-n-pentylcaprolactam
3-cyclohexyl-2-pyrrolidone
3-cyclohexyl-4-ethylheptanoic acid lactam
N-ethyl-3-tert-butylcaprolactam According to this invention H₂S is reacted with at least one of the lactams of Formula I at an elevated temperature generally from 150° to 350° C., preferably ranging from 200° to 325° C., for a time period in the general range of 0.5 to 24 hours, preferably from 3 to 18 hours. The pressure present during the reaction of the hydrogen sulfide and at least one lactam can vary from atmospheric to 5000 p.s.i.g. The reaction between the lactams and H₂S is carried on, at least in part, in the presence of at least a finite amount, i.e., at least 0.1 percent based on the hydrogen sulfide charge of a basic material. The basic material suitable to this invention is selected from the group consisting of alkali metal hydroxides and ammonium hydroxide. It should be noted that the hydroxides, at least in part, contemplated by this invention include sodium, potassium, lithium, rubidium, cesium, and ammonium and, of these, sodium hydroxide is preferred. It should also be noted that mixtures of the above hydroxides can be employed.

The relative amounts of hydrogen sulfide and lactam utilized will generally be a mol ratio range of from 0.1/1 to 10/1, preferably less than 1/1. In the absence of base, it is preferred that a H₂S/lactam ratio of at least 8/1 be employed; preferably about 8/1 to about 10/1.

The amount of basic material present during all, or any part, of the reaction will generally range from 0 to 20 percent by weight based on the hydrogen sulfide charge and preferably will be above 0.1 percent by weight based on the hydrogen sulfide charge when a basic material is present in finite amounts.

Following the reaction of the hydrogen sulfide and lactam, the product thiolactam can be recovered by any well-known and conventional process such as distillation, crystallization and the like.

Example

N-methylpyrrolidine-2-thione was prepared by the reaction of H₂S and N-methyl-2-pyrrolidinone according to the process of this invention.

In this run 2000 ml. (19.7 moles) of N-methyl-2-pyrrolidinone, 20 grams of NaOH and 221 grams (6.5 moles) of $H_2S$ were charged to a one gallon, stainless steel autoclave, equipped with a stirrer and heater, while stirring to 300° C. for 4 hours. The reaction mixture was then cooled to about 25° C., discharged from the autoclave, diluted with approximately 4 liters of water, and extracted with chloroform. The chloroform phase was then washed with water, stripped of $CHCl_3$ and distilled at reduced pressure, yielding 140 grams of N-methylpyrrolidine-2-thione, $B._{20}$ 143° C. ($B._{10}$ 128° C.), $n_D^{20}$ 1.5768. This compares to the reported [Chem. Abs., 52, 939 (1958)] boiling point of 125–132° C. at 10 mm. Hg absolute.

An elemental analysis of the product gave the following results:

| Element | Weight Percent | |
|---|---|---|
| | Calculated for $C_5H_9NS$ | Found |
| C | 52.09 | 54.9 |
| H | 7.87 | 8.1 |
| N | 12.22 | 11.3 |
| S | 27.82 | 24.3 |

Various modifications of this invention can be made, or followed, in view of the foregoing, without departing from the spirit or the scope thereof.

I claim:
1. A method for producing thiolactams comprising reacting at an elevated temperature a lactam represented by the formula:

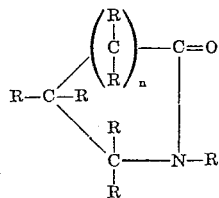

wherein each R is selected from the group consisting of hydrogen, alkyl and cycloalkyl of from 1 to 6 carbon atoms, inclusive, wherein $n$ is a whole integer selected from the group consisting of 0 to 10, inclusive, and wherein the total number of carbon atoms in said lactams does not exceed 20, with hydrogen sulfide in a quantity sufficient to form at least one compound represented by the formula:

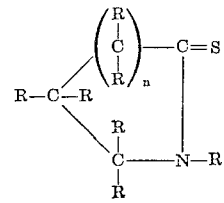

wherein R and $n$ are as defined above, provided that during the above reacting step at least one of the group consisting of alkali metal hydroxides and ammonium hydroxide in an amount in the range of 0–20 weight percent based on the $H_2S$ charged is present and recovering the product thiolactam.

2. A method according to claim 1 wherein a molar excess of the lactam relative to the amount of hydrogen sulfide is used.

3. A method according to claim 1 wherein the reaction is carried on at a temperature of at least about 150° C. and a pressure of at least about atmospheric.

4. A method according to claim 1 wherein the alkali metal hydroxide is sodium hydroxide.

5. A method according to claim 1 wherein the temperature is in the range of 150–350° C., the ratio of hydrogen sulfide to lactam is less than 1/1, the amount of the material from the group consisting of alkali metal hydroxides and ammonium hydroxide is present in a finite amount.

6. A method according to claim 5 wherein the material provided to be in the presence of the lactam and $H_2S$ is NaOH in the range of 0.1–20 percent by weight based on the amount of $H_2S$ used and the mol ratio of $H_2S$/lactam is in the range of 0.1/1 to 10/1.

7. A method for making N-methylpyrrolidine-2-thione comprising reacting N-methyl-2-pyrrolidinone with $H_2S$ in the presence of NaOH at an elevated temperature and pressure for a period of time sufficient to produce said thione.

8. A method according to claim 7 wherein the amount of $H_2S$ based on the pyrrolidinone is about 30 mol percent, the amount of NaOH based on the $H_2S$ is about 10 weight percent, and the temperature is about 300° C.

References Cited by the Examiner
UNITED STATES PATENTS
2,201,200   5/1940   Pinkney _____ 260—313 X
2,806,879   9/1957   Kaiser et al. _____ 260—551

ALEX MAZEL, *Primary Examiner.*
MARY O'BRIEN, *Assistant Examiner.*